(12) United States Patent
Lucca (10) Patent No.: US 12,203,479 B2
(45) Date of Patent: Jan. 21, 2025

(54) SYSTEM AND METHOD FOR MONITORING AN EXTRACTOR FAN OF AN AGRICULTURAL HARVESTER

(71) Applicant: CNH Industrial Brasil Ltda., Nova Lima (BR)

(72) Inventor: João Augusto Marcolin Lucca, Piracicaba-SP (BR)

(73) Assignee: CNH Industrial Brasil Ltda., Nova Lima (BR)

( * ) Notice: Subject to any disclaimer, the term of this patent is extended or adjusted under 35 U.S.C. 154(b) by 0 days.

(21) Appl. No.: 18/514,257

(22) Filed: Nov. 20, 2023

(65) Prior Publication Data

US 2024/0175440 A1    May 30, 2024

(30) Foreign Application Priority Data

Nov. 25, 2022   (BR) ...................... 10 2022 024072 8

(51) Int. Cl.
| | | |
|---|---|---|
| *F04D 27/00* | (2006.01) | |
| *A01D 17/10* | (2006.01) | |
| *A01D 34/125* | (2006.01) | |
| *A01D 34/16* | (2006.01) | |
| *A01D 34/83* | (2006.01) | |

(Continued)

(52) U.S. Cl.
CPC ........... *F04D 27/001* (2013.01); *A01D 45/10* (2013.01); *H04Q 9/00* (2013.01); *A01D 17/10* (2013.01); *A01D 17/101* (2013.01); *A01D 34/125* (2013.01); *A01D 34/16* (2013.01); *A01D 34/83* (2013.01); *A01D 34/833* (2013.01); *A01D 34/8355* (2013.01); *A01D 57/10* (2013.01); *H04Q 2209/40* (2013.01)

(58) Field of Classification Search
CPC combination set(s) only.
See application file for complete search history.

(56) References Cited

U.S. PATENT DOCUMENTS

| 4,924,662 | A | * | 5/1990 | Quick | .................... | A01D 45/10 56/122 |
|---|---|---|---|---|---|---|
| 5,092,110 | A | * | 3/1992 | Dommert | ............... | A01D 45/10 56/16.5 |

(Continued)

FOREIGN PATENT DOCUMENTS

| BR | 102014021086 B1 | 7/2020 |
|---|---|---|
| DE | 102012025647 B3 | 9/2014 |

*Primary Examiner* — Binh Q Tran
(74) *Attorney, Agent, or Firm* — Peter K. Zacharias; Rebecca L. Henkel; Rickard K. DeMille (57) ABSTRACT

A system for monitoring an extractor fan of an agricultural harvester includes an extractor fan having a shaft configured to be coupled to a rotational drive source for rotationally driving the shaft, a fan hub coupled to a lower shaft end of the shaft such that rotation of the shaft rotationally drives the fan hub about a fan hub axis, with the fan hub extending between an upstream side and a downstream side along the fan hub axis, and fan blades coupled to and extending radially outwardly from the fan hub. The system further includes a sensor that generates data indicative of acceleration of the extractor fan. Additionally, the system includes a computing system that determines an acceleration of the extractor fan based at least in part on the data, and determines whether the extractor is imbalanced based at least in part on the acceleration of the extractor fan.

20 Claims, 6 Drawing Sheets

(51) Int. Cl.
    *A01D 34/835*     (2006.01)
    *A01D 45/10*     (2006.01)
    *A01D 57/10*     (2006.01)
    *H04Q 9/00*     (2006.01)

(56) References Cited

U.S. PATENT DOCUMENTS

| | | | |
|---|---|---|---|
| 6,062,009 A * | 5/2000 | Caillouet | A01D 45/10 |
| | | | 460/44 |
| 10,091,934 B2 | 10/2018 | Dugas et al. | |
| 10,278,332 B2 | 5/2019 | Burch | |
| 10,645,876 B2 | 5/2020 | Dugas et al. | |
| 11,044,848 B2 | 6/2021 | Reiners et al. | |
| 2014/0295923 A1 * | 10/2014 | Vergote | A01D 45/10 |
| | | | 460/98 |
| 2017/0251601 A1 * | 9/2017 | Dugas | A01F 12/56 |
| 2019/0166760 A1 * | 6/2019 | Palla | H04L 67/75 |
| 2020/0337235 A1 * | 10/2020 | Blank | A01M 21/043 |
| 2021/0022289 A1 | 1/2021 | Berry | |
| 2021/0185920 A1 | 6/2021 | Chaney | |
| 2022/0217908 A1 * | 7/2022 | Cazenave | F04D 27/007 |

* cited by examiner

SYSTEM AND METHOD FOR MONITORING AN EXTRACTOR FAN OF AN AGRICULTURAL HARVESTER

CROSS-REFERENCE TO RELATED APPLICATIONS

The present application is related and has right of priority to Brazilian Patent Application No. 10 2022 024072 8 filed on Nov. 25, 2022, the entirety of which is incorporated by reference for all purposes.

FIELD OF THE INVENTION

The present subject matter relates generally to agricultural harvesters, such as sugar cane harvesters, and, more particularly, to systems and methods for monitoring an extractor fan of an agricultural harvester.

BACKGROUND OF THE INVENTION

Typically, agricultural harvesters include one or more extractors configured to separate and remove pieces of debris or thresh from a stream of harvested crops, such as a stream of sugar cane billets. For example, a sugarcane harvester often includes a primary extractor positioned near an intake end of an elevator assembly that conveys crops toward a receiver collecting the crops, and a secondary extractor positioned near a discharge end of the elevator assembly. For conventional sugarcane harvesters, both the primary extractor and the secondary extractor include an axial flow extractor fan positioned directly in-line with the flow of debris through the extractor. For instance, the extractor fan typically includes a fan hub positioned in the center of the extractor, with fan blades extending radially outwardly from the hub. While conventional extractor fans often provide adequate performance, room still exists for improving the overall operating efficiency and performance of extractor fan assemblies. Particularly, as one or more components of the extractor fans become worn, the extractor fans may become imbalanced which can lead to the extractor fan motors breaking. Further, if the extractor fans are operated too aggressively, crop may be removed with debris, which can cause early wear of the fan blades in addition to increased crop losses.

Accordingly, systems and methods for monitoring an extractor fan of an agricultural harvester would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a system for monitoring an extractor fan of an agricultural harvester. The system may include an extractor fan. The extractor fan may have a shaft extending along a rotational axis between an upper shaft end and a lower shaft end, with the upper shaft end being configured to be coupled to a rotational drive source for rotationally driving the shaft about the rotational axis. The extractor fan may further have a fan hub coupled to the lower shaft end of the shaft such that rotation of the shaft rotationally drives the fan hub about a fan hub axis, with the fan hub extending between an upstream side and a downstream side along the fan hub axis. Further, the extractor fan may include a plurality of fan blades coupled to and extending radially outwardly from the fan hub. The system may further include a sensor configured to generate data indicative of acceleration of the extractor fan. Additionally, the system may include a computing system communicatively coupled to the sensor, with the computing system being configured to receive the data generated by the sensor, determine an acceleration of the extractor fan based at least in part on the data, and determine whether the extractor fan is imbalanced based at least in part on the acceleration of the extractor fan.

In another aspect, the present subject matter is directed to a method for monitoring an extractor fan of an agricultural harvester. The extractor fan may include a shaft coupled between a rotational drive source and a fan hub such that rotation of the shaft by the rotational drive source rotationally drives the fan hub about a fan hub axis, where the fan hub extends between an upstream side and a downstream side along the fan hub axis. The extractor fan additionally includes a plurality of fan blades coupled to and extending radially outwardly from the fan hub. The method may include controlling the rotational drive source to rotationally drive the fan hub. The method may further include receiving, with a computing system, data generated by a sensor, the data being indicative of acceleration of the extractor fan. Moreover, the method may include determining, with the computing system, an acceleration of the extractor fan based at least in part on the data. Additionally, the method may include determining, with the computing system, whether the extractor fan is imbalanced based at least in part on the acceleration of the extractor fan.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a system and method for monitoring an extractor fan of an agricultural harvester, such as a sugarcane harvester. Specifically, the extractor fan may include a shaft configured to support a hub relative to an extractor housing and rotationally drive the hub to rotate fan blades about the hub axis. As the fan blades rotate, a suction force is created by the fan, from an upstream side of the hub past a downstream side of the hub, that extracts debris from the flow of crop flowing past the extractor fan. The extractor fan may further include a hub cover, which may help guide the flow of extracted debris around the hub, through the blades. When the fan blades wear unevenly, the extractor fan may start vibrating. Given the length of the shaft, the more unevenly the fan blades wear, the more severe the vibrations. The vibrations of the extractor fan may cause significant damage to a drive source rotating the shaft, as well as to other parts of the harvester. Further, when the extractor fan is operated too aggressively, the suction force created by the extractor fan may be large enough that crop is also guided to exit the extractor, causing crop loss and potential damage to the fan blades.

Thus, in accordance with aspects of the present subject matter, a sensor may be provided, with the sensor being configured to generate data indicative of the acceleration of the extractor fan. A computing system of the disclosed system may be configured to determine the acceleration of the extractor fan based at least in part on the data generated by the sensor, where the computing system may then determine, based on the acceleration of the extractor fan, whether the extractor fan is imbalanced. In some instances, the computing system may further determine crop losses from crop hitting the extractor fan. Preferably, the sensor is a wireless sensor such that a complicated wiring harness that can withstand the high rotation of the extractor fan and debris is not needed. Additionally, the sensor is preferably positioned such that it is easily accessible to an operator, such fixed relative to the hub covering.

As such, the disclosed system and method may allow the acceleration of the extractor fan to be easily monitored, which may in turn, protect the harvester against damage caused by imbalance of the extractor fan and, optionally, help reduce crop losses.

Figure 1:
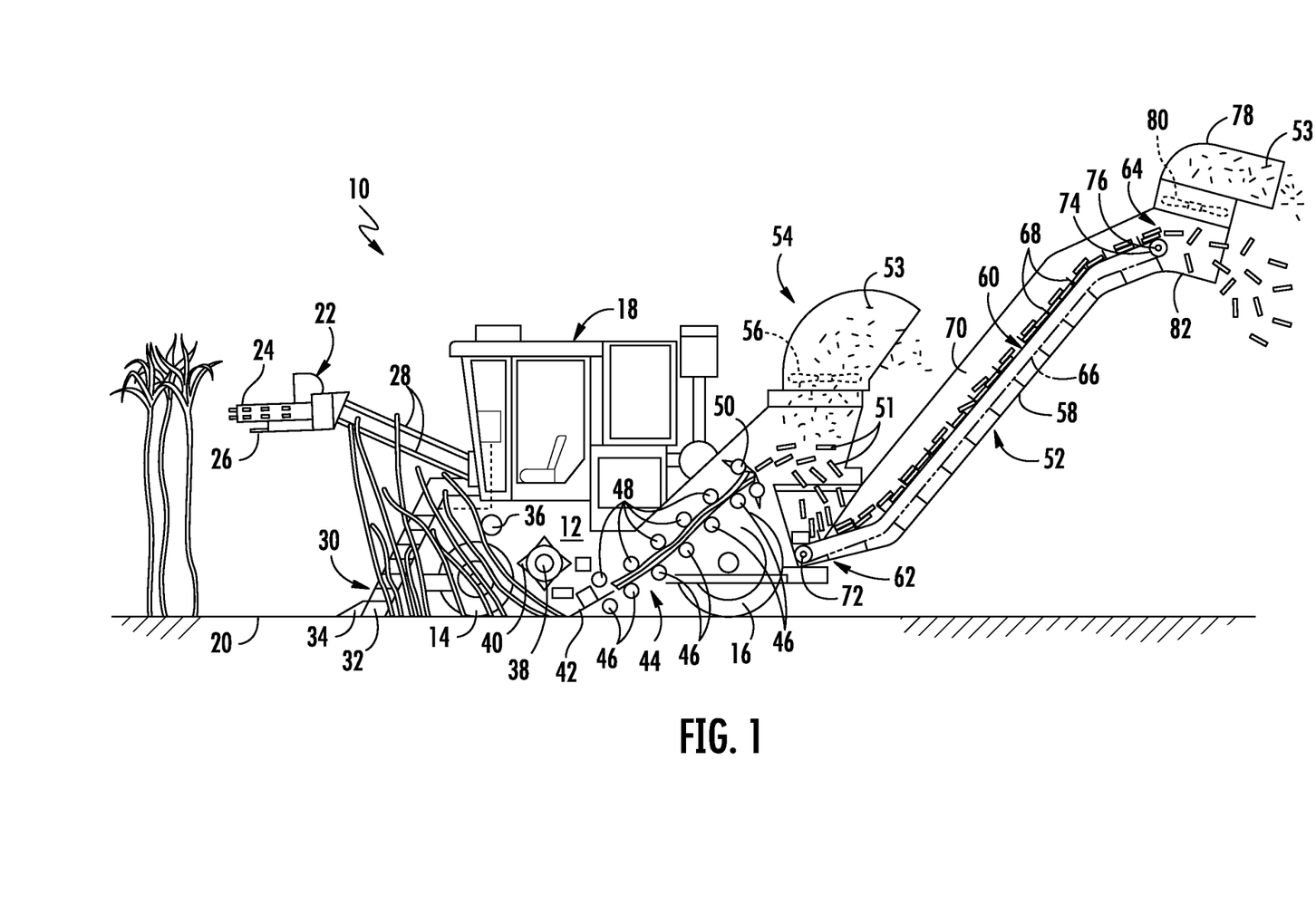
FIG. 1 illustrates a simplified, side view of one embodiment of an agricultural harvester in accordance with aspects of the present subject matter.

Referring now to the drawings, FIG. 1 illustrates a side view of one embodiment of an agricultural harvester 10 in accordance with aspects of the present subject matter. As shown, the harvester 10 is configured as a sugarcane harvester. However, in other embodiments, the harvester 10 may correspond to any other suitable agricultural harvester known in the art.

As shown in FIG. 1, the harvester 10 includes a frame 12, a pair of front wheels 14, a pair of rear wheels 16, and an operator's cab 18. The harvester 10 may also include a primary source of power (e.g., an engine mounted on the frame 12) which powers one or both pairs of the wheels 14, 16 via a transmission (not shown). Alternatively, the harvester 10 may be a track-driven harvester and, thus, may include tracks driven by the engine as opposed to the illustrated wheels 14, 16. The engine may also drive a hydraulic fluid pump (not shown) configured to generate pressurized hydraulic fluid for powering various hydraulic components of the harvester 10.

Additionally, the harvester 10 may include various components for cutting, processing, cleaning, and discharging sugar cane as the cane is harvested from an agricultural field 20. For instance, the harvester 10 may include a topper assembly 22 positioned at its front end to intercept sugar cane as the harvester 10 is moved in the forward direction. As shown, the topper assembly 22 may include both a gathering disk 24 and a cutting disk 26. The gathering disk 24 may be configured to gather the sugar cane stalks so that the cutting disk 26 may be used to cut off the top of each stalk. As is generally understood, the height of the topper assembly 22 may be adjustable via a pair of arms 28 hydraulically raised and lowered, as desired, by the operator.

Additionally, the harvester 10 may include a crop divider 30 that extends upwardly and rearwardly from the field 20. In general, the crop divider 30 may include two spiral feed rollers 32. Each feed roller 32 may include a ground shoe 34 at its lower end to assist the crop divider 30 in gathering the sugar cane stalks for harvesting. Moreover, as shown in FIG. 1, the harvester 10 may include a knock-down roller 36 positioned near the front wheels 14 and a fin roller 38 positioned behind the knock-down roller 36. As the knock-down roller 36 is rotated, the sugar cane stalks being harvested are knocked down while the crop divider 30 gathers the stalks from agricultural field 20. Further, as shown in FIG. 1, the fin roller 38 may include a plurality of intermittently mounted fins 40 that assist in forcing the sugar cane stalks downwardly. As the fin roller 38 is rotated during the harvest, the sugar cane stalks that have been knocked down by the knock-down roller 36 are separated and further knocked down by the fin roller 38 as the harvester 10 continues to be moved in the forward direction relative to the field 20.

Referring still to FIG. 1, the harvester 10 may also include a base cutter assembly 42 positioned behind the fin roller 38. As is generally understood, the base cutter assembly 42 may include blades (not shown) for severing the sugar cane stalks as the cane is being harvested. The blades, located on the periphery of the assembly 42, may be rotated by a hydraulic motor (not shown) powered by the vehicle's hydraulic system. Additionally, in several embodiments, the blades may be angled downwardly to sever the base of the sugar cane as the cane is knocked down by the fin roller 38.

Moreover, the harvester 10 may include a feed roller assembly 44 located downstream of the base cutter assembly 42 for moving the severed stalks of sugar cane from the base cutter assembly 42 along the processing path. As shown in FIG. 1, the feed roller assembly 44 may include a plurality of bottom rollers 46 and a plurality of opposed, top pinch rollers 48. The various bottom and top rollers 46, 48 may be used to pinch the harvested sugar cane during transport. As the sugar cane is transported through the feed roller assembly 44, debris (e.g., rocks, dirt, and/or the like) may be allowed to fall through bottom rollers 46 onto the field 20.

In addition, the harvester 10 may include a chopper assembly 50 located at the downstream end of the feed roller assembly 44 (e.g., adjacent to the rearward-most bottom and top feed rollers 46, 48). In general, the chopper assembly 50 may be used to cut or chop the severed sugar cane stalks into pieces or "billets" 51 which may be, for example, six (6) inches long. The billets 51 may then be propelled towards an elevator assembly 52 of the harvester 10 for delivery to an external receiver or storage device (not shown).

As is generally understood, pieces of debris 53 (e.g., dust, dirt, leaves, etc.) separated from the sugar cane billets 51 may be expelled from the harvester 10 through a primary extractor 54, which is located behind the chopper assembly 50 and is oriented to direct the debris 53 outwardly from the harvester 10. Additionally, an extractor fan 56 may be mounted at the base of the primary extractor 54 for generating a suction force or vacuum sufficient to pick up the debris 53 and force the debris 53 through the primary extractor 54. The debris 53 is then directed out of and away from harvester 10 via an outlet of the primary extractor 54. The separated or cleaned billets 51, heavier than the debris 53 being expelled through the extractor 54, may then fall downward to the elevator assembly 52.

As shown in FIG. 1, the elevator assembly 52 may generally include an elevator housing 58 and an elevator 60 extending within the elevator housing 58 between a lower, proximal end 62 and an upper, distal end 64. In general, the elevator 60 may include a looped chain 66 and a plurality of flights or paddles 68 attached to and evenly spaced on the chain 66. The paddles 68 may be configured to hold the sugar cane billets 51 on the elevator 60 as the billets 51 are elevated along a top span of the elevator 70 defined between its proximal and distal ends 62, 64. Additionally, the elevator 60 may include lower and upper sprockets 72, 74 positioned at its proximal and distal ends 62, 64, respectively. As shown in FIG. 1, an elevator motor 76 may be coupled to one of the sprockets (e.g., the upper sprocket 74) for driving the chain 66, thereby allowing the chain 66 and the paddles 68 to travel in an endless loop between the proximal and distal ends 62, 64 of the elevator 60.

Moreover, pieces of debris 53 (e.g., dust, dirt, leaves, etc.) separated from the elevated sugar cane billets 51 may be expelled from the harvester 10 through a secondary extractor 78 coupled to the rear end of the elevator housing 58. As shown in FIG. 1, the secondary extractor 78 may be located adjacent to the distal end 64 of the elevator 60 and may be oriented to direct the debris 53 outwardly from the harvester 10. Additionally, an extractor fan 80 may be mounted at the base of the secondary extractor 78 for generating a suction force or vacuum sufficient to pick up the debris 53 and force the debris 53 through the secondary extractor 78. The separated, cleaned billets 51, heavier than the debris 53 expelled through the extractor 78, may then fall from the distal end 64 of the elevator 60. Typically, the billets 51 may fall downwardly through a discharge opening 82 of the elevator assembly 52 into an external storage device (not shown), such as a sugar cane billet cart.

During operation, the harvester 10 is traversed across the agricultural field 20 for harvesting sugar cane. After the height of the topper assembly 22 is adjusted via the arms 28, the gathering disk 24 on the topper assembly 22 may function to gather the sugar cane stalks as the harvester 10 proceeds across the field 20, while the cutter disk 26 severs the leafy tops of the sugar cane stalks for disposal along either side of harvester 10. As the stalks enter the crop divider 30, the ground shoes 34 may set the operating width to determine the quantity of sugar cane entering the throat of the harvester 10. The spiral feed rollers 32 then gather the stalks into the throat to allow the knock-down roller 36 to bend the stalks downwardly in conjunction with the action of the fin roller 38. Once the stalks are angled downwardly as shown in FIG. 1, the base cutter assembly 42 may then sever the base of the stalks from field 20. The severed stalks are then, by movement of the harvester 10, directed to the feed roller assembly 44.

The severed sugar cane stalks are conveyed rearwardly by the bottom and top feed rollers 46, 48, which compress the stalks, to make them more uniform, and shake loose debris to pass through the bottom rollers 46 to the field 20. At the downstream end of the feed roller assembly 44, the chopper assembly 50 cuts or chops the compressed sugar cane stalks into pieces or billets 51. Airborne debris or chaff 53 (e.g., dust, dirt, leaves, etc.) separated from the sugar cane billets 51 is then extracted through the primary extractor 54 using suction created by the extractor fan 56. The separated/cleaned billets 51 then fall downwardly into the elevator assembly 52 and travel upwardly via the elevator 60 from its proximal end 62 to its distal end 64. During normal operation, once the billets 51 reach the distal end 64 of the elevator 60, the billets 51 fall through the discharge opening 82 to an external storage device. Similar to the primary extractor 54, chaff is blown out from harvester 10 through the secondary extractor 78 with the aid of the extractor fan 80.

Figure 2:
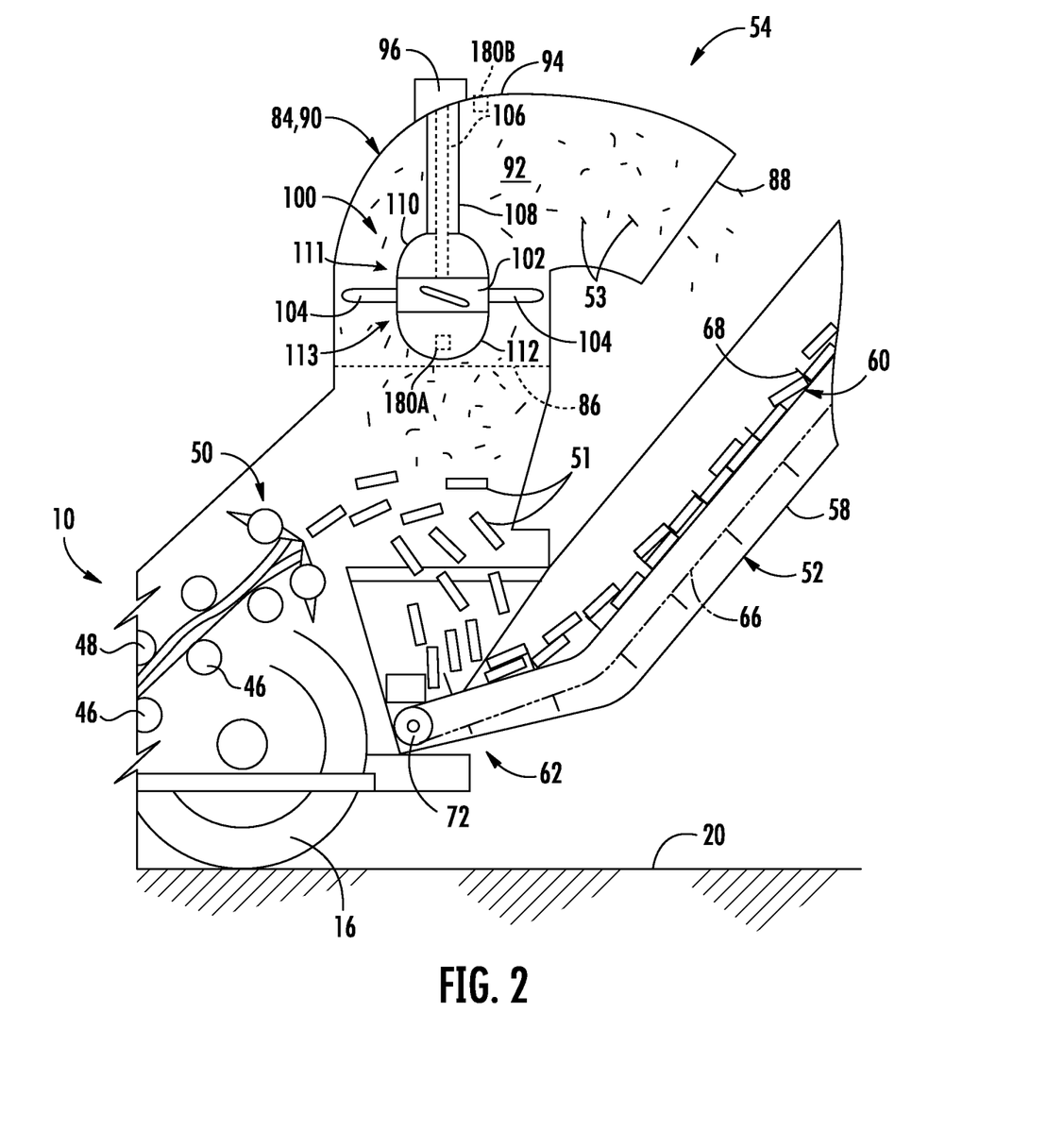
FIG. 2 illustrates a side view of a portion of the agricultural harvester shown in FIG. 1, particularly illustrating a schematic view of one embodiment of an extractor fan assembly installed within the primary extractor of the harvester in accordance with aspects of the present subject matter.

Referring now to FIG. 2, a partial side view of the agricultural harvester 10 shown in FIG. 1 is illustrated, particularly illustrating a schematic view of one embodiment of an extractor fan assembly 100 installed within the primary extractor 54 of the harvester 10 in accordance with aspects of the present subject matter. In general, the fan assembly 100 will be described herein with reference to being installed within a harvester's primary extractor (e.g., as a replacement for fan 56 shown in FIG. 1). However, in other embodiments, the disclosed fan assembly 100 may also be installed within a harvester's secondary extractor (e.g., as a replacement for fan 80 shown in FIG. 1).

As shown in FIG. 2, the extractor 54 may generally include an extractor housing 84 extending from an extractor inlet (e.g., as indicated by dashed line 86 in FIG. 2) to an extractor outlet 88. The extractor housing 84 may include an exterior housing wall 90 extending around the outer perimeter of the housing 84 such that the housing 84 defines an airflow channel 92 between the extractor inlet 86 and outlet 88 for directing debris 53 through the housing 84 for subsequent discharge from the extractor 54 via the outlet 88. As such, debris 53 directed into the inlet 86 of the extractor housing 84 may flow through the airflow channel 92 prior to being discharged from the extractor 54 at the extractor outlet 88.

Additionally, as shown in FIG. 2, an extractor fan assembly 100 is positioned within the extractor housing 84. As will be described below, the fan assembly 100 may include various components, including, but not limited to, a fan hub 102, a plurality of fan blades 104 coupled to and extending radially outwardly from the hub 102, a shaft 106 configured to rotationally drive the hub 102 (and, thus, the blades 104), a shaft housing 108 encasing the shaft 106, an upper hub covering 110 configured to be installed relative to a top or downstream side 111 of the fan hub 102, and a lower hub covering 112 configured to be installed relative to a bottom or upstream side 113 of the fan hub 102. As shown in FIG. 2, the fan assembly 100 may be installed within the extractor housing 84 such that the hub/blades are positioned within the airflow channel 92 defined by the housing 84. For example, an upper portion of the shaft housing 108 may be coupled to a top portion 94 of the extractor housing 84 to allow the various assembly components to be suspended from or otherwise supported by the housing 84. Additionally, a rotational drive source 96, such as a hydraulic motor driven by the vehicle's hydraulic system or any other suitable motor, may be installed along the top portion 94 of the extractor housing 84 (e.g., along the exterior of the top portion 94 of the housing 84) and may be rotationally coupled to the shaft 106. As such, the rotational drive source 96 may rotationally drive the shaft 106, which may, in turn, rotationally drive the hub/blades to allow the fan assembly 100 to generate a suction force at the extractor inlet 86 that draws debris 53 upwardly away from the stream of billets 51 expelled from the chopper assembly 50 and into the airflow channel 92 defined by the extractor housing 84 for subsequent delivery to the extractor outlet 88. The cleaned billets 51 may then fall onto the elevator assembly 52 for transport to a suitable receiver.

The fan assembly 100 may generally have an overall fan diameter defined by the radially outer ends of the fan blades 104. In general, the fan diameter may be slightly less than a corresponding inner diameter of the extractor housing 84 such that a radial clearance is defined between the radially outer ends of each fan blade 104 and the inner surface of the housing 84. In one embodiment, the radial clearance may correspond to a radial distance that is greater than 10 millimeters (mm) and less than 21 mm, such as a distance ranging from about 12 mm to about 19 mm, or from about 14 mm to about 17 mm, or from about 15 mm to about 16 mm, and/or any other subranges therebetween. In a particular embodiment, the radial clearance defined between the radially outer ends of each fan blade 104 and the inner surface of the housing 84 may be equal to 15.5 mm plus or minus 2% (e.g., plus or minus 0.3).

Figure 3:
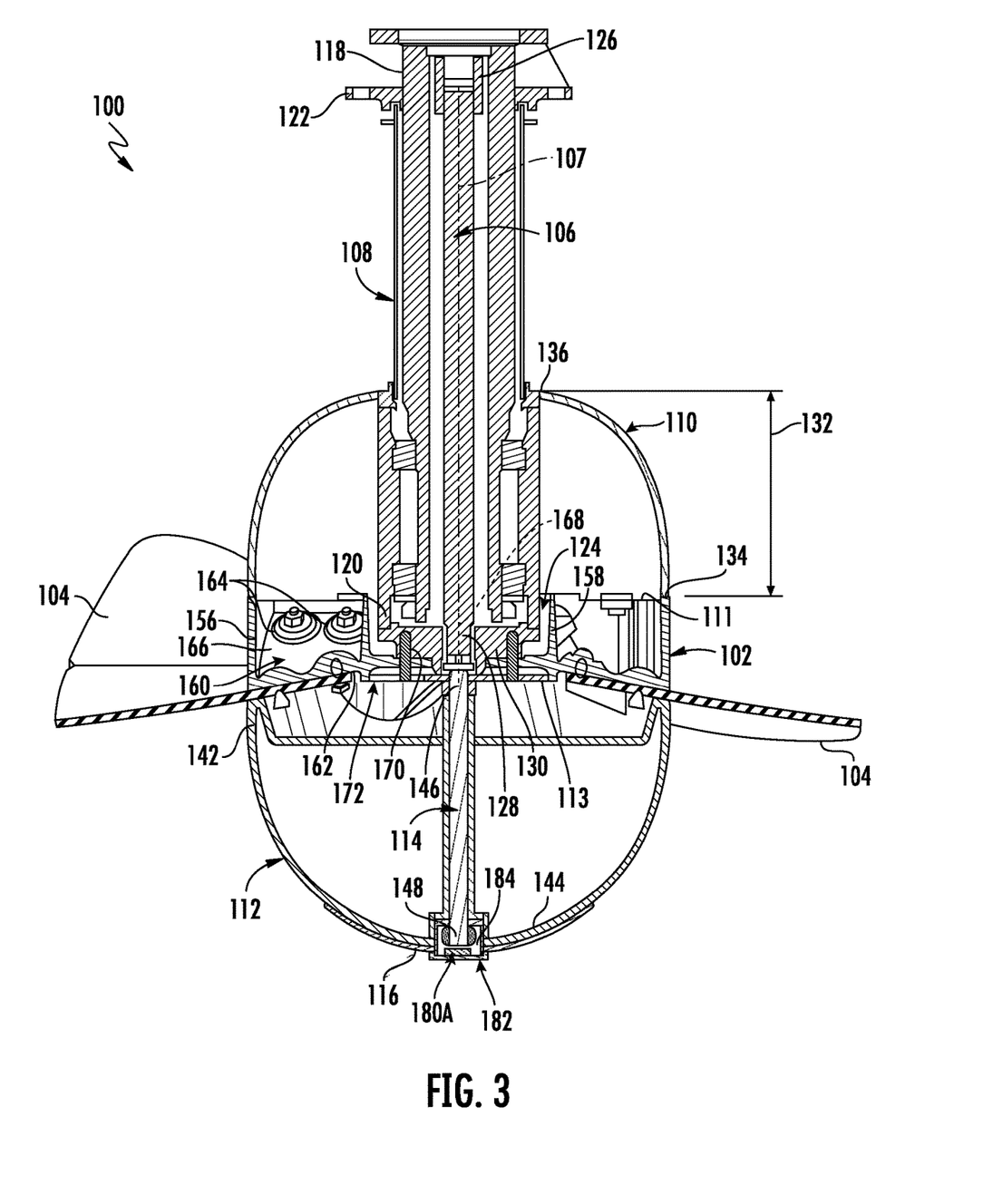
FIG. 3 illustrates a detailed, cross-sectional view of one embodiment of the fan assembly shown in FIG. 2 in accordance with aspects of the present subject matter.

Referring now to FIG. 3, a cross-sectional view of the extractor fan assembly 100 described above with reference to FIG. 2 is illustrated in accordance with aspects of the present subject matter. As indicated above, the fan assembly 100 may generally include the fan hub 102 and the plurality of blades 104 coupled to and extending radially outwardly from the hub 102. For example, the fan assembly 100 includes four circumferentially spaced fan blades 104 (only two of which are shown) extending radially outwardly from the hub 102. Moreover, as indicated above, the fan assembly 100 may also include the shaft 106 configured to rotationally drive the hub/blades, and a shaft housing 108 encasing at least a portion of the shaft 106. Additionally, the fan assembly 100 may further include various other components, including, but not limited to, the upper hub covering 110, the lower hub covering 112, a support member or shaft 114 coupled to the shaft 106 and extending through the lower hub covering 112, and a nose cap 116 installed on the lower hub covering 112 and supported by the support member 114.

In general, the shaft housing 108 of the fan assembly 100 may correspond to a hollow member configured to extend lengthwise between an upper housing end 118 and a lower housing end 120. The upper housing end 118 of the shaft housing 108 may be configured to be coupled to a portion of the extractor housing 84 (e.g., the top portion 94 of the housing 84 shown in FIG. 2). For example, as shown in FIG. 3, one or more mounting flanges 122 may be positioned at or adjacent to the upper housing end 118 for coupling the shaft housing 108 to the extractor housing 84. Additionally, the lower housing end 120 of the shaft housing 108 may be configured to be positioned at or adjacent to the fan hub 102. For example, a portion of the shaft housing 108 disposed at or adjacent to its lower housing end 120 may be configured to be received within a central shaft cavity 124 defined by the hub 102.

The shaft 106 of the fan assembly 100 may generally be configured to extend lengthwise within the interior of the shaft housing 108 such that the shaft housing 108 encases or encircles the shaft 106 along at least a portion of its length. As shown in FIG. 3, the shaft 106 may generally extend lengthwise between an upper shaft end 126 and a lower shaft end 128 along a rotational axis 107. In one embodiment, a portion of the shaft 106 at or adjacent to its upper shaft end 126 may be accessible at the upper housing end 118 of the shaft housing 108 to allow the shaft 106 to be coupled to an associated rotational drive source (e.g., source 96 shown in FIG. 2). For instance, when the upper housing end 118 of the shaft housing 108 is coupled to the extractor housing 84, a portion of the shaft 108 may be configured to extend through an opening defined in the extractor housing 84 at the location of such coupling to allow its upper shaft end 126 to be rotationally coupled to the rotational drive source 96 positioned along the exterior of the housing 84. Additionally, the lower shaft end 128 of the shaft 106 may be configured to be coupled to the fan hub 102. For example, the hub 102 may include a central mounting wall 130 configured to allow the lower shaft end 128 of the shaft 106 to be coupled to the hub 102 such that the hub 102 is rotatable about a central hub axis 168. In one embodiment, the central hub axis 168 is coaxial to the rotational axis 107 of the shaft 106.

In general, the fan hub 102 may include an outer hub wall 156 and an inner hub wall 158 spaced radially inwardly from the outer hub wall 156, with the outer hub wall 156 generally defining the outer circumference of the hub 102. Additionally, the hub 102 includes a plurality of circumferentially spaced blade mounting flanges 160 (only one of which is shown) extending radially between the inner and outer hub walls 158, 156. In one embodiment, the hub 102 includes four blade mounting flanges 160 extending between the inner and outer hub walls 158, 156, with the center of each mounting flange 160 being generally spaced apart from the center of adjacent blade mounting flanges by 90 degrees. Each mounting flange 160 may define a mounting side or face 162 along which a corresponding fan blade 104 of the extractor assembly 100 is configured to be mounted. For example, once the fan blade 104 is placed on or adjacent to the mounting face 162 of a given mounting flange 160, suitable fasteners (e.g., bolts) may be inserted through both the fan blade 104 and corresponding openings 164 defined through the flange 160. A nut or other fastening member may then be secured to each fastener along the opposed side or face 166 of each flange 160 to secure the blade 104 to the hub 102. The mounting face 162 of each mounting flange 160 may be angled in the circumferential direction and/or the axial direction of the hub 102 to allow each fan blade 104 to be mounted onto the hub 102 at a given blade angle. In addition, the mounting face 162 of each mounting flange 160 may also define an arcuate or curved profile that generally corresponds to the radius of curvature of the fan blade 104 to allow the blade 104 to be secured flush against the adjacent mounting face 162.

Additionally, as shown in FIG. 3, the fan hub 102 may define an open-ended shaft cavity 124 extending radially between the central axis 168 of the hub 102 and the inner hub wall 158. The shaft cavity 124 may also be configured to extend axially along the central axis 168 between a lower end defined by a central mounting wall 130 of the hub 102 and an upper end that is open along the top or downstream side 111 of the hub 102. As such, the lower shaft end 128 of the shaft 106 (and, optionally, the lower housing end 120 of the shaft housing 108) may be received within the shaft cavity 124. In such an embodiment, the lower shaft end 128 of the shaft 106 may be configured to be coupled to the central mounting wall 130 of the hub 102 to allow the shaft 106 to be rotationally coupled to the hub 102. For example, the central mounting wall 130 may define a plurality of fastener openings 170 configured to receive suitable mechanical fasteners for coupling the shaft 106 to the hub 102, such as by directly coupling the shaft 106 to the hub 102 via a shaft flange formed integrally with or otherwise coupled to the lower shaft end 128 of the shaft 106. As such, the hub 102 may be rotationally driven about its central axis 168 (generally parallel to the axis 107 of the shaft 106) by the associated rotational drive source (e.g., source 96 shown in FIG. 2) via the shaft 106.

In addition to the upper shaft cavity 124, the fan hub 102 may also define a lower cavity 172 along the bottom or upstream side 113 of the fan hub 102. For example, the lower cavity 172 may extend radially between the central axis 168 of the hub 102 and the portion of the inner hub wall 158 extending axially downwardly from the central mounting wall 130 in the direction of the upstream side 113 of the hub 102 such that the central mounting wall 130 generally serves as a divider wall between the shaft cavity 124 and the lower cavity 172. In one embodiment, the lower cavity 172 may be configured to accommodate any suitable components for supporting the support member 114 relative to the hub 102 and/or for coupling the primary shaft 106 to the hub 102.

As indicated above, the fan assembly 100 may also include the upper hub covering 110 configured to be installed relative to the top or downstream side 111 of the fan hub 102 and the lower hub covering 112 configured to be installed relative to the bottom or upstream side 113 of the fan hub 102. For instance, the hub 102 may include one or more mounting features for mounting the upper hub covering 110 to the fan hub 102. For example, the hub 102 may include a plurality of mounting tabs 174 (not shown) spaced circumferentially apart from one another along the top or upstream side 111 of the hub 102, such as four mounting tabs 174 spaced apart from one another by approximately 90 degrees. In such an embodiment, the upper hub covering 110 may include corresponding mounting features for allowing the hub covering 110 to be coupled to the hub 102 at each mounting tab 174 via suitable mechanical fasteners.

As shown in FIG. 3, the upper hub covering 110 may be configured to extend outwardly from the downstream side 111 of the fan hub 102 in a direction along or parallel to the shaft axis 107 such that the upper hub covering 110 encases or encircles a lower portion of the shaft housing 108. For example, the upper hub covering 110 may extend outwardly from the downstream side 111 of the fan hub 102 along a height 132 defined between a bottom end 134 of the covering 110 configured to be coupled or positioned adjacent to the downstream side 111 of the fan hub 102 and a top end 136 of the covering 110, with the upper hub covering 110 encasing the lower portion of the shaft housing 108 along the height 132 defined between its top and bottom ends 136, 134. Additionally, as shown in the illustrated embodiment, the upper hub covering 110 may be configured as a dome-shaped member such that it defines a tapered or semi-spherical profile as it extends vertically between its bottom and top ends 134, 136. For instance, the dome-shaped covering 110 may be configured to define an inwardly tapered profile as it extends outwardly from the hub 102 such that a diameter 138 of the upper hub covering 110 generally decreases from its bottom end 134 to its top end 134.

As shown in FIG. 3, the lower hub covering 112 may be configured to be installed relative to the hub 102 such that the covering 112 extends outwardly from the upstream side 113 of the fan hub 102 in a direction along or parallel to the shaft axis 107. For example, the lower hub covering 112 may be configured to extend vertically between a top end 142 configured to be coupled or positioned adjacent to the upstream side 113 of the fan hub 102 and a bottom end 144 spaced apart from the upstream side 113 of the fan hub 102. Additionally, as shown in the illustrated embodiment, the lower hub covering 112 may be configured as a dome-shaped member such that it defines a semi-spherical profile as it extends vertically between its top and bottom ends 142, 144. It should be appreciated, however, that the lower hub covering 112 may have any other suitable profile.

It should be appreciated that the upper and lower hub coverings 110, 112 may be configured to provide suitable flow surfaces for the flow of air being directed around the fan hub 102 so as to increase the overall aerodynamic efficiency of the assembly 100. For example, the lower hub covering 112 may be configured to serve as an aerodynamic, upstream nose for the fan hub 102 such that the flow of air being directed through the extractor housing 84 is efficiently diverted around the hub 102. Additionally, the upper hub covering 112 may be configured to define a transition surface for the airflow flowing past the top or downstream side 111 of the hub 102.

It should be appreciated that the hub coverings 110, 112 may have any other suitable shape or profile, such as a conical-shaped profile. It should additionally be appreciated that, in general, the hub coverings 110, 112 may be formed from any suitable material. However, in a particular embodiment, the hub coverings 110, 112 may be formed from a suitable metal material, such as steel, aluminum and/or any other suitable metal. In other embodiments, the hub coverings 110, 112 may be formed from a suitable plastic or resin material.

As shown in FIG. 3, the support member 114 of the fan assembly 100 may generally be configured to extend through the lower hub covering 112 and connect to the nose cap 116 positioned at the bottom end 144 of the covering 112. Specifically, the support member 114 may generally extend lengthwise between a first end 146 and a second end 148, with the first end 146 being coupled to the lower shaft end 128 of the shaft 106 and the second end 148 being coupled to the nose cap 116. Additionally, the nose cap 116 may generally define a dome-shaped profile that is generally complementary to the dome-shape profile of the lower hub covering 112 such that the nose cap 116 extends adjacent to a portion of the outer surface of the lower hub covering 112 defined around the bottom end 144 of such covering 112. In one embodiment, the nose cap 116 may be configured to serve as a retention or support feature for the lower hub covering 112, such as by vertically supporting the bottom end 144 of the covering 112 relative to hub 102 via the connection provided by the support member 114.

Figure 4:
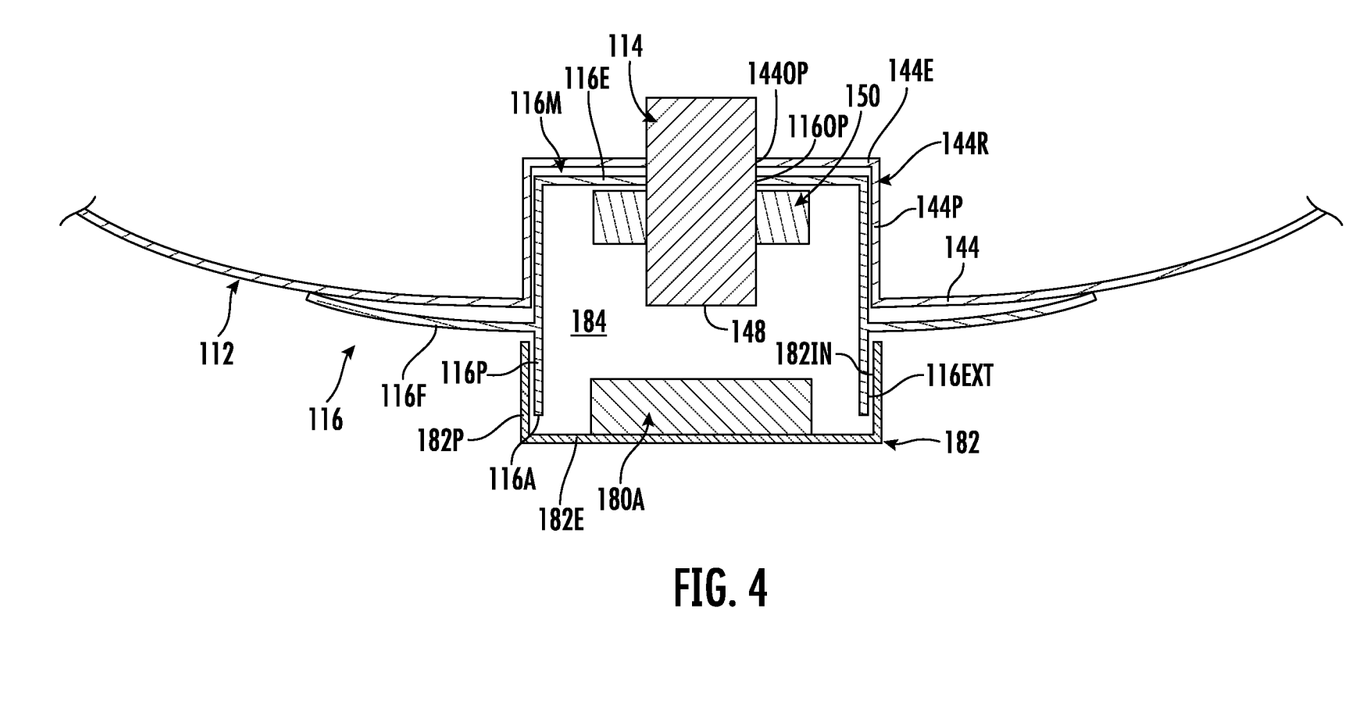
FIG. 4 illustrates a detailed, cross-sectional view of the bottom of the fan assembly shown in FIG. 3 in accordance with aspects of the present subject matter.

For instance, referring now to FIG. 4, a detailed, cross-sectional view of the bottom view of the fan assembly shown in FIG. 3 is illustrated in accordance with aspects of the present subject matter. Particularly, the nose cap 116 has a mounting portion 116M, including an end wall 116E and a perimeter wall 116P extending generally around and outwardly from the perimeter of the end wall 116E, and a flange portion 116F extending at least partially around and outwardly from the perimeter of the mounting portion 116M (e.g., from the perimeter wall 116P), the flange portion 116F covering a portion of the bottom end 144 of the lower hub covering 112. In one embodiment, the end wall 116E is circular, such that the perimeter wall 116P is cylindrical. However, the end wall 116E and the perimeter wall 116P may have any other suitable shape. The mounting portion 116M (e.g., the end wall 116E) may include an opening 116OP through which the second end 148 of the support member 114 may extend. The bottom end 144 of the lower hub covering 112 may include a similar opening 144OP through which the second end 148 of the support member 114 may extend. As such, the end wall 116E and/or the flange portion 116F may abut against the bottom end 144 of the lower hub covering 112 such that the openings 116OP, 144OP are aligned. As such, the second end 148 of the support member 114 may extend through both of the openings 116OP, 144OP. A fastener 150 (e.g., nut, locking nut, and/or the like) may then be attached through an open access end 116A of the nose cap 116 to the second end 148 of the support member 114 to vertically support the nose cap 116 (e.g., the end wall 116E) on the support member 114 and, thus, the bottom end 144 of the covering 112 relative to the hub 102.

In some embodiments, a recess 144R is defined within the lower hub covering 112 proximate the bottom end 144, the recess 144R being configured to at least partially receive the mounting portion 116M. For example, the recess 144R has an end wall 144E defining the opening 144OP and a perimeter wall 144P extending around and outwardly from the end wall 144E. The end wall 116E of the mounting portion 116M may be configured to at least partially rest against the end wall 144E of the recess 144R when the mounting portion 116M is at least partially received within the recess 144R, with the openings 116OP, 144OP being aligned.

Generally, as fan blades 104 of the fan assembly 100 wear, the fan assembly 100 must be operated at increasingly higher speeds to compensate for the reduction in surface area. Further, as the shaft 106 (FIGS. 2 and 3) is long, and as the fan hub 102, blades 104 (FIGS. 2 and 3), and hub coverings 110, 112 (FIG. 3) together are relatively heavy, vibrations of the shaft 106, fan hub 102, blades 104, and hub coverings 110, 112 may increase in magnitude when the fan blades 104 increasingly wear unevenly, where the vibrations may cause significant damage to the rotational drive source (e.g., source 96 shown in FIG. 2) and to other parts of the harvester 10. Further, if the fan assembly 100 is operated too aggressively, crop (e.g., billets) may be extracted by the extractor fan along with debris, which causes crop loss and potentially additional wear on the fan blades 104.

Thus, in accordance with aspects of the present subject matter, one or more sensors may be provided in association with the fan assembly 100 to generate data indicative of accelerations of the fan assembly 100. For example, as further shown in FIG. 2, one or more first sensors 180A may be associated with a hub covering (e.g., the lower hub covering 112). Each of the first sensor(s) 180A may be configured to generate data indicative of acceleration of the respective hub covering (e.g., hub covering 112). As particularly shown in FIGS. 3 and 4, the first sensor(s) 180A may be installed on the extractor fan assembly 100 such that it is fixed relative to the lower hub covering 112. For instance, in one embodiment, the first sensor(s) 180A are fixed relative to the nose cap 116. For example, in some embodiments, the first sensor(s) 180A may be fixable to an end cap 182, which in turn, is fixable to the nose cap 116 such that it is supported relative to the lower hub covering 112. In one embodiment, as particularly shown in FIG. 4, the end cap 182 has an end wall 182E and a perimeter wall 182P that extends around and outwardly from the perimeter of the end wall 182E in a direction generally parallel to the shaft axis 107. In some embodiments, the first sensor(s) 180A is coupled to the end wall 182E of the end cap 182. However, in other embodiments, the first sensor(s) 180A are additionally, or alternatively, coupled to the perimeter wall 182P of the end cap 182.

As further shown in FIG. 4, in some embodiments, the perimeter wall 182P of the end cap 182 extends at least partially around the outside of the perimeter wall 116P of the nose cap 116. For instance, an inner surface 182IN of the perimeter wall 182P of the end cap 182 may be configured to extend around (e.g., circumferentially around) an exterior surface 116EXT of the perimeter wall 116P of the nose cap 116. In such embodiments, the inner surface 182IN of the perimeter wall 182P of the end cap 182 may be threaded to mesh with one or more threads on the exterior surface 116EXT of the perimeter wall 116P of the nose cap 116 to couple the end cap 182 to the nose cap 116. However, it should be appreciated that the perimeter wall 182P of the end cap 182 may instead be received within the outside of the perimeter wall 116P of the nose cap 116. Additionally, it should be appreciated that the end cap 182 may be coupled to the nose cap 116 in any other suitable manner, such as by screws, rivets, welding, and/or the like.

In at least some embodiments, when the end cap 182 is coupled to the nose cap 116, an interior chamber 184 is at least partially defined by the end cap 182 and the nose cap 116. The first sensor(s) 180A may be received within the interior chamber 184 such that the first sensor(s) 180A are at least partially protected against debris. In some embodiments, the second end 148 of the support member 114 and the fastener 150 are also received within the interior chamber 184, which further helps protect the coupling between the lower hub covering 112 and the support member 114. Further, by positioning the first sensor(s) 180A at the bottom end 144 of the lower hub covering 112, the first sensor(s) 180A may be easily accessible by an operator.

It should be appreciated that the first sensor(s) 180A may be supported relative to the lower hub covering 112 in any other suitable way such that the first sensor(s) 180A are protected from debris while still being able to generate data indicative of acceleration or vibration of the fan assembly 100. For instance, in some embodiments, the first sensor(s) 180A are additionally, or alternatively, coupled to the nose cap 116. For example, the first sensor(s) 180A may be coupled or fixed to the nose cap 116 within the interior chamber 184. In one or more embodiments, the first sensor(s) 180A are additionally, or alternatively, coupled to the lower hub covering 112. For example, the first sensor(s) 180A may be coupled or fixed to an interior surface of the lower hub covering. In some embodiments, the first sensor(s) 180A are additionally, or alternatively, coupled to the support member 114. For example, the first sensor(s) 180A may be coupled or fixed to the second end 148 of the support member 114 within the interior chamber 184.

However, it should be appreciated that the first sensor(s) 180A may be positioned at any other suitable location relative to the extractor fan assembly 100 to generate data indicative of acceleration of the fan assembly 100, such as on the upper hub covering 110, the fan hub 102, the shaft 106, the shaft housing 108, and/or the like.

As will be described below in greater detail, the data from the first sensor(s) 180A may be used to determine the acceleration of the hub covering (e.g., hub covering 112), which may, in turn, be indicative of the acceleration of the fan assembly 100. The acceleration of the fan assembly 100 may be monitored to determine when the fan assembly 100 is, or predicted to become, imbalanced and/or when crop losses are excessive.

Additionally, in some embodiments, as shown in FIG. 2, one or more second sensors 180B are provided and configured to generate data indicative of acceleration of the harvester 10. For instance, in one embodiment, the second sensor(s) 180B are provided in association with the extractor housing 84. Particularly, the second sensor(s) 180B may be fixed on an exterior surface and/or an interior surface of the extractor housing 84 such that the second sensor(s) 180B may generate data indicative of acceleration of the extractor housing 84. In one embodiment, the second sensor(s) 180B are positioned proximate to where the shaft 106 is supported on the extractor housing 84, such as on the housing 84 next to the drive source(s) 96, or on a housing of the drive source(s) 96. However, it should be appreciated that, in other embodiments, the second sensor(s) 180B may be positioned at any other suitable location on the harvester 10 to generate data indicative of acceleration of the harvester 10 due to motion of the harvester 10, independent of the fan assembly 100, such as accelerations caused by the harvester 10 moving across a field.

As will be additionally described below in greater detail, the data from the second sensor(s) 180B may be used to determine the acceleration of the extractor housing 84, which may be indicative of the acceleration of the harvester 10, independent of the fan assembly 100. The acceleration of the fan assembly 100 determined from the first sensor(s) 180A may thus, be adjusted based on the acceleration of the extractor housing 84 to account for acceleration of the harvester 10, independent of the fan assembly 100.

It should be appreciated that the sensor(s) 180A, 180B may be configured as any suitable sensors for generating the data indicative of acceleration. For instance, the sensor(s) 180A, 180B may be configured as accelerometers or gyroscopes. Further, it should be appreciated that the sensor(s) 180A, 180B may be wireless sensors configured to wirelessly transmit generated data. As the environment of the extractor fan assembly 100 is subject to a lot of debris and high speeds, it is difficult to provide wiring for equipment, such as for sensor(s) 180A, 180B, within the extractor housing 84 that will not require frequent replacement. Thus, by configuring the sensor(s) 180A, 180B as a wireless sensor(s), the sensor(s) 180A, 180B are easier to install and require less maintenance.

Figure 5:
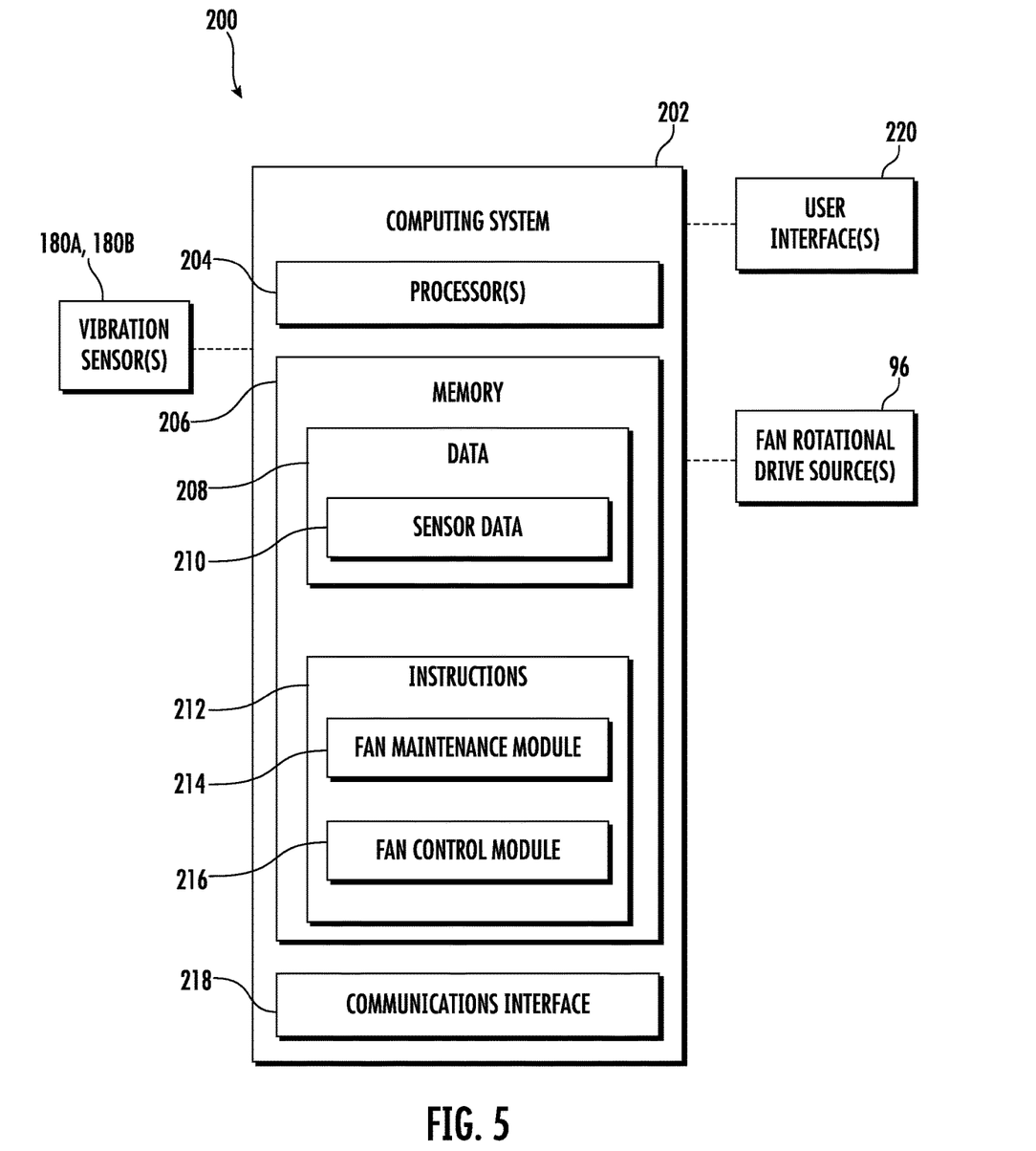
FIG. 5 illustrates a schematic view of a system for monitoring an extractor fan of an agricultural harvester in accordance with aspects of the present subject matter.

Referring now to FIG. 5, a schematic view of one embodiment of a control system 200 for monitoring an extractor fan of an agricultural harvester is illustrated in accordance with aspects of the present subject matter. In general, the control system 200 will be described herein with reference to the harvester 10 described with reference to FIG. 1, the extractor fan assembly 100 described with reference to FIGS. 2-4, and the sensor(s) 180A, 180B described with reference to FIGS. 2 and 4. However, it should be appreciated that the disclosed control system 200 may be used with any suitable agricultural work vehicle having any other suitable vehicle configuration, with any suitable extractor fan assembly 100, and/or with any other suitable sensors having any other suitable sensor configuration.

As shown, the control system 200 may include any combination of components of the harvester 10 described above with reference to FIGS. 1-4. For instance, the system 200 may include a rotational drive source 96 for driving the fan(s) 100 and the sensor(s) 180A, 180B for generating data indicative of acceleration or vibration of the fan assembly 100 (e.g., of the lower hub covering 112, which is indicative of acceleration or vibration of the fan assembly 100) and the extractor housing 84, respectively. Further, the control system 200 may additionally include one or more user interfaces 220 associated with the agricultural harvester 10. In general, the user interface(s) 220 may correspond to any suitable input device(s) configured to allow the operator to provide operator inputs to the computing system 202, such as a touch screen display, a keyboard, joystick, buttons, knobs, switches, and/or combinations thereof located within the cab 18 of the harvester 10 or at a location separate of the harvester 10. The operator may provide various inputs into the system 202 via the user interface(s) 220. In one embodiment, suitable operator inputs may include, but are not limited to, a target extractor fan aggressiveness (e.g., acceptable crop loss through the extractor assembly 100, acceptable debris remaining after passing the extractor assembly 100, and/or the like). In addition, the user interface(s) 220 may also be configured to provide feedback (e.g., feedback associated with the extractor fan aggressiveness and/or maintenance of the extractor fan) to the operator. As such, the user interface 220 may include one or more output devices (not shown), such as display screens, speakers, warning lights, and/or the like, which are configured to provide feedback from the computing system 202 to the operator.

Moreover, as shown in FIG. 5, the control system 200 may include a computing system 202 installed on and/or otherwise provided in operative association with the harvester 10. In general, the computing system 202 may correspond to any suitable processor-based device(s), such as a computing device or any combination of computing devices. Thus, in several embodiments, the computing system 202 may include one or more processor(s) 204 and associated memory device(s) 206 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 206 of the computing system 202 may generally comprise memory element(s) including, but not limited to, computer readable medium (e.g., random access memory (RAM)), computer readable non-volatile medium (e.g., a flash memory), a compact disc-read only memory (CD-ROM), a magneto-optical disk (MOD), a digital versatile disc (DVD) and/or other suitable memory elements. Such memory device(s) 206 may generally be configured to store suitable computer-readable instructions that, when implemented by the processor(s) 204, configure the computing system 202 to perform various computer-implemented functions, such as one or more aspects of the control algorithms and/or methods described herein.

In one embodiment, the memory 206 of the computing system 202 may include one or more databases for storing information associated with the operation of the harvester 10, including data 208 associated with determining acceleration or vibrations of the extractor fan assembly 100. For instance, as shown in FIG. 5, the memory 206 may include a sensor database 210 for storing first data provided by the first sensor(s) 180A that is associated with accelerations of the associated hub covering (e.g., lower hub covering 112) and, optionally, second data provided by the second sensor(s) 180B that is associated with accelerations of the extractor housing 84. Specifically, the computing system 202 may be communicatively coupled to each of the sensor(s) 180A, 180B, directly or indirectly, to allow the data generated by the sensor(s) 180A, 180B to be transmitted to the computing system 202. As such, the computing system 202 may be configured to continuously or periodically monitor and store the data generated by the sensor(s) 180A, 180B for subsequent processing and/or analysis.

Referring still to FIG. 5, in several embodiments, the memory 206 of the computing system 202 may store instructions 212 that, when executed by the processor(s) 204, configure the computing system 202 to execute a fan maintenance module 214. For instance, the fan maintenance module 214 may be configured to determine when the fan assembly 100 needs to be serviced, such as when the fan blades 104 need to be replaced. For example, as discussed above, the first data generated by the first sensor(s) 180A may be indicative of vibrations or accelerations of the hub covering 112, which may in turn be indicative of vibrations or accelerations of the fan assembly 100. When the fan assembly 100 is imbalanced, the fan assembly 100 begins to vibrate or accelerate, which may cause damage to the fan rotational drive source(s) 96. As such, the fan maintenance module 214 may be configured to determine the acceleration of the extractor fan assembly 100 based at least in part on the first data generated by the first sensor(s) 180A. Accordingly, the fan maintenance module 214 may include any suitable relationships or algorithms for determining the acceleration of the extractor fan assembly 100 based at least in part on the first data generated by the first sensor(s) 180A.

In some instances, as indicated above, the first data generated by the first sensor(s) 180A may be indicative of both the acceleration of the fan assembly 100 and the acceleration of the extractor housing 84 due to the movement of the harvester 10, for example. As such, in some embodiments, the fan maintenance module 214 may determine the acceleration of the extractor fan assembly 100 based at least in part on the first data generated by the first sensor(s) 180A and the second data generated by the second sensor(s) 180B. For instance, the fan maintenance module 214 may generally correct the acceleration of the hub covering 112 determined based on the first data by accounting for the acceleration of the extractor housing 84. For example, the fan maintenance module 214 may simply subtract the acceleration determined based on the second data from the acceleration determined based on the first data to determine the corrected acceleration of the extractor fan assembly 100. However, it should be appreciated that the corrected acceleration of the extractor fan assembly 100 may be determined in any other suitable manner. For instance, the fan maintenance module 214 may include any suitable relationships or algorithms for determining the acceleration of the extractor fan assembly 100 based at least in part on the first data generated by the first sensor(s) 180A and the second data generated by the second sensor(s) 180B.

After determining the acceleration of the extractor fan assembly 100 based at least in part on the first data generated by the first sensor(s) 180A and optionally the second data generated by the second sensor(s) 180B, the fan maintenance module 214 may then compare the acceleration of the extractor fan assembly 100 to a first acceleration threshold associated with excessive acceleration or vibration of the extractor fan assembly 100. When the acceleration of the extractor fan assembly 100 is greater than the first acceleration threshold across or for at least a first period of time, the fan maintenance module 214 may determine that the extractor fan assembly 100 is imbalanced and requires maintenance (e.g., that the fan blades 104 may likely need replacement). Conversely, when the acceleration of the extractor fan assembly 100 is greater than the first acceleration threshold for less than the first period of time or is less than the first acceleration threshold, the fan maintenance module 214 may determine that the extractor fan assembly 100 is balanced and does not yet require maintenance, and may be experiencing billet loss, as will be described below. In some embodiments, the fan maintenance module 214 may monitor the acceleration of the extractor fan assembly 100 over at least part of the operation time of the extractor fan assembly 100 and determine an acceleration increase rate at which the acceleration of the extractor fan assembly 100 is increasing. Thus, when the extractor fan assembly 100 is determined to be balanced, the fan maintenance module 214 may also determine a remaining time until the extractor fan is likely to become imbalanced or, in other words, is likely to require maintenance based on the acceleration increase rate and a current acceleration of the extractor fan assembly 100. It should be appreciated that the remaining time may be provided in hours or days of operation, in distance, in acres, and/or any other suitable metric. It should also be appreciated that the first acceleration threshold may be stored in the data 208 of the computing system 202 or may be stored in any other suitable location, or may otherwise be received, determined, or selected in any suitable manner.

In some embodiments, the fan maintenance module 214 may further be configured to initiate a control action based at least in part on acceleration of the extractor fan assembly 100. For instance, when the extractor fan assembly 100 is determined to be imbalanced, the fan maintenance module 214 may control an operation of the user interface(s) 220 to indicate that the extractor fan assembly 100 is imbalanced and requires maintenance. Similarly, when the extractor fan assembly 100 is determined to be balanced, the fan maintenance module 214 may control an operation of the user interface(s) 220 to indicate the remaining time until the fan assembly 100 is likely to require maintenance. In some embodiments, the fan maintenance module 214 may preemptively request a maintenance appointment for the extractor fan assembly 100 based at least in part on the extractor fan assembly 100 being imbalanced and/or the remaining time being below a threshold remaining time.

The memory 206 may further store instructions 212 that, when executed by the processor(s) 204, configure the computing system 202 to execute a fan control module 216. For instance, the fan control module 216 may be configured to determine the crop loss through the extractor fan assembly 100 based at least in part on the sensor data 210. For example, when the acceleration of the extractor fan assembly 100 determined based at least in part on the first data generated by the first sensor(s) 180A and optionally the second data generated by the second sensor(s) 180B, is momentarily larger than usual, such as when the acceleration of the extractor fan assembly 100 is greater than the first threshold acceleration for less than the first period of time, crop (e.g., billets) may be detected as hitting the extractor fan assembly 100. As such, the fan control module 216 may monitor instances where the acceleration of the extractor fan assembly 100 is greater than a second acceleration threshold for less than a second period of time to determine how often crop is impacting the extractor fan assembly 100, and thus, estimate the crop losses of the extractor fan assembly 100. In one instance, the fan control module 216 may monitor when a difference between a current acceleration of the extractor fan assembly 100 and an average of the acceleration of the extractor fan assembly 100 over at least part of the operation time of the assembly 100 is greater than the second acceleration threshold. However, it should be appreciated that the crop losses may be determined in any other suitable manner. Moreover, it should be appreciated that the second acceleration threshold may be stored in the data 208 of the computing system 202 or may be stored in any other suitable location, or may otherwise be received, determined, or selected in any suitable manner. Additionally, it should be appreciated that, in some embodiments the second acceleration threshold may be the same as the first acceleration threshold and/or that the second period of time may be the same as the first period of time, and alternatively, it should be appreciated that, in some embodiments the second acceleration threshold may be different from the first acceleration threshold and/or that the second period of time may be different from the first period of time.

The fan control module 216 may further be configured to compare the crop loss to a crop loss threshold. When the crop loss is greater than the crop loss threshold, the fan control module 216 may be configured to initiate a control action. For instance, in one embodiment, when the crop loss is higher than the crop loss threshold, the fan control module 216 may be configured to control an operation of the user interface(s) 220 to indicate that the crop loss is higher than desired and/or to indicate recommended actions to reduce crop loss. In some embodiments, when the crop loss is higher than the crop loss threshold, the fan control module 216 may be configured to automatically control an operation of the fan rotational drive source(s) 96 to reduce the speed of the hub 102 and blades 104.

It should be appreciated that, in some embodiments, the fan maintenance module 214 may also take into account the crop loss determined by the fan control module 216 when determining the remaining time until maintenance is required. For instance, the higher the crop loss, the higher the wear on the fan blades 104, and the lower the remaining time.

It should also be appreciated that the computing system 202 may also include various other suitable components, such as a communications circuit or interface 226, a network interface, one or more input/output channels, a data/control bus and/or the like, to allow the computing system 202 to be communicatively coupled with any of the various other system components described herein.

Figure 6:
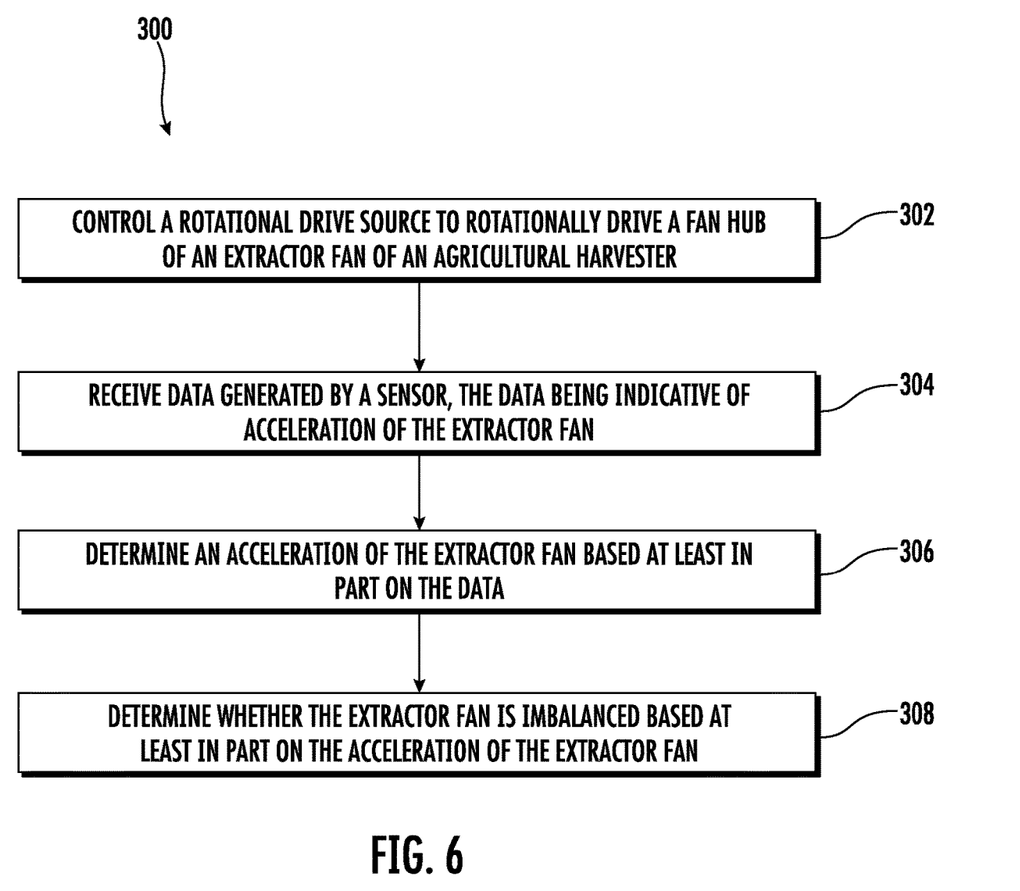
FIG. 6 illustrates a flow diagram of one embodiment of a method for monitoring an extractor fan of an agricultural harvester in accordance with aspects of the present subject matter.

Referring now to FIG. 6, a flow diagram of one embodiment of a method 300 for monitoring an extractor fan of an agricultural harvester (e.g., harvester 10) is illustrated in accordance with aspects of the present subject matter. For purposes of discussion, the method 300 will generally be described herein with reference to the harvester 10 described with reference to FIG. 1, the extractor fan assembly 100 described with reference to FIGS. 2-4, the sensor(s) 180A, 180B described with reference to FIGS. 2 and 4, and the system described with reference to FIG. 5. However, it should be appreciated that the disclosed method 300 may be used with any suitable agricultural work vehicle having any other suitable vehicle configuration, with any suitable extractor fan assembly 100, with any other suitable sensors having any other suitable sensor configuration, and/or with any other suitable system having any other suitable system configuration. Additionally, although FIG. 6 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 6, at (302), the method 300 includes controlling a rotational drive source to rotationally drive a fan hub of an extractor fan of an agricultural harvester. For instance, as described above, the rotational drive source 96 may be controlled to rotate the shaft 106, which may, in turn, rotate the fan hub 102 of the extractor fan assembly 100 of the agricultural harvester 10.

Further, at (304), the method 300 includes receiving data generated by a sensor, the data being indicative of acceleration of the extractor fan assembly. For example, as discussed above, the computing system 202 may receive data generated by the first sensor(s) 180A supported relative to the hub covering 112 extending outwardly from the fan hub 102, with the data being indicative of acceleration of the hub covering 112, and thus, of the extractor fan assembly 100.

Moreover, at (306), the method 300 includes determining an acceleration of the extractor fan based at least in part on the data. For instance, as described above, the computing system 202 may be configured to determine an acceleration of the extractor fan assembly 100 (e.g., of the hub 102) based at least in part on the data generated by the sensor(s) 180A.

Additionally, at (308), the method 300 includes determining whether the extractor fan is imbalanced based at least in part on the acceleration of the extractor fan. For instance, as discussed above, the computing system 202 may be configured to determine whether the extractor fan assembly 100 is imbalanced based at least in part on the acceleration of the extractor fan assembly 100.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. A system for monitoring an extractor fan of an agricultural harvester, the system comprising:
    an extractor fan comprising:
        a shaft extending along a rotational axis between an upper shaft end and a lower shaft end, the upper shaft end configured to be coupled to a rotational drive source for rotationally driving the shaft about the rotational axis;
        a fan hub coupled to the lower shaft end of the shaft such that rotation of the shaft rotationally drives the fan hub about a fan hub axis, the fan hub extending between an upstream side and a downstream side along the fan hub axis; and
        a plurality of fan blades coupled to and extending radially outwardly from the fan hub;
    a sensor configured to generate data indicative of acceleration of the extractor fan; and
    a computing system communicatively coupled to the sensor, the computing system being configured to:
        receive the data generated by the sensor;
        determine an acceleration of the extractor fan based at least in part on the data; and determine whether the extractor fan is imbalanced based at least in part on the acceleration of the extractor fan.

2. The system of claim 1, wherein the computing system is configured to determine whether the extractor fan is imbalanced by comparing the acceleration of the extractor fan to a first acceleration threshold, the extractor fan being imbalanced when the acceleration of the extractor fan is greater than the first acceleration threshold for at least a first period of time, the extractor fan being balanced when the acceleration of the extractor fan is greater than the first acceleration threshold for less than the first period of time or when the acceleration of the extractor fan is less than the first acceleration threshold.

3. The system of claim 1, wherein the extractor fan further comprises a hub covering extending outwardly from the fan hub, the hub covering being installed relative to the upstream side of the fan hub, the hub covering extending lengthwise between an upper end positioned adjacent to the upstream side of the fan hub and a bottom end spaced apart from the upstream side of the fan hub.

4. The system of claim 3, the extractor fan further comprising a nose cap covering a portion of the bottom end of the hub covering, wherein the sensor is fixed relative to the nose cap.

5. The system of claim 4, the extractor fan further comprising an end cap coupled to the nose cap, the sensor being coupled to the end cap.

6. The system of claim 4, the extractor fan further comprising an end cap coupled to the nose cap,
wherein the nose cap includes a mounting portion and a flange portion extending at least partially around a perimeter of the mounting portion, the flange portion covering the portion of the bottom end of the hub covering,
wherein the end cap is coupled to the mounting portion such that the end cap and the mounting portion at least partially define an interior chamber, the nose cap being supported relative to the bottom end of the hub covering within the interior chamber, and the sensor being positioned within the interior chamber.

7. The system of claim 1, further comprising:
an extractor housing, wherein the upper shaft end of the shaft is supported relative to the extractor housing such that the shaft is rotatable relative to the extractor housing; and
a second sensor supported relative to the extractor housing, the second sensor being configured to generate second data indicative of acceleration of the extractor housing,
wherein the computing system is configured to determine the acceleration of the extractor fan based at least in part on the data generated by the sensor and the second data generated by the second sensor.

8. The system of claim 1, wherein the sensor comprises an accelerometer.

9. The system of claim 1, wherein the sensor is a wireless sensor configured to wirelessly transmit the data.

10. A method for monitoring an extractor fan of an agricultural harvester, the extractor fan including a shaft coupled between a rotational drive source and a fan hub such that rotation of the shaft by the rotational drive source rotationally drives the fan hub about a fan hub axis, the fan hub extending between an upstream side and a downstream side along the fan hub axis, the extractor fan additionally including a plurality of fan blades coupled to and extending radially outwardly from the fan hub, the method comprising:
controlling the rotational drive source to rotationally drive the fan hub;
receiving, with a computing system, data generated by a sensor, the data being indicative of acceleration of the extractor fan;
determining, with the computing system, an acceleration of the extractor fan based at least in part on the data; and
determining, with the computing system, whether the extractor fan is imbalanced based at least in part on the acceleration of the extractor fan.

11. The method of claim 10, wherein determining whether the extractor fan is imbalanced comprises comparing the acceleration of the extractor fan to a first acceleration threshold, the extractor fan being imbalanced when the acceleration of the extractor fan is greater than the first acceleration threshold for at least a first period of time, the extractor fan being balanced when the acceleration of the extractor fan is greater than the first acceleration threshold for less than the first period of time or when the acceleration of the extractor fan is less than the first acceleration threshold.

12. The method of claim 11, wherein, when the extractor fan is balanced, the method further includes:
determining an acceleration increase rate based at least in part on the data; and
determining remaining time until the extractor fan is imbalanced based at least in part on the acceleration increase rate and a current acceleration of the extractor fan, the current acceleration being determined based at least in part on the data.

13. The method of claim 12, further comprising controlling, with the computing system, a user interface to indicate the remaining time.

14. The method of claim 11, further comprising determining crop loss of the extractor fan based at least in part on when the acceleration of the extractor fan is greater than the first acceleration threshold for less than the first period of time.

15. The method of claim 14, further comprising initiating, with the computing system, a control action based at least in part on the crop loss.

16. The method of claim 10, further comprising controlling, with the computing system, a user interface to indicate that the extractor fan is imbalanced when the extractor fan is determined to be imbalanced.

17. The method of claim 10, wherein the shaft is supported relative to an extractor housing such that the shaft is rotatable relative to the extractor housing, the method further comprising:
receiving, with the computing system, second data generated by a second sensor supported relative to the extractor housing, the second data being indicative of acceleration of the extractor housing,
wherein determining the acceleration of the extractor fan comprises determining the acceleration of the extractor fan relative to the extractor housing based at least in part on the data generated by the sensor and the second data generated by the second sensor.

18. The method of claim 10, wherein the extractor fan further comprises a hub covering extending outwardly from the fan hub, the hub covering being installed relative to the upstream side of the fan hub, the hub covering extending lengthwise between an upper end positioned adjacent to the upstream side of the fan hub and a bottom end spaced apart from the upstream side of the fan hub, and wherein the extractor fan further comprises a nose cap covering a portion of the bottom end of the hub covering, the sensor being fixed relative to the nose cap.

19. The method of claim 18, the extractor fan further comprising an end cap coupled to the nose cap, the sensor being coupled to the end cap.

20. The method of claim 18, the extractor fan further comprising an end cap coupled to the nose cap,
wherein the nose cap includes a mounting portion and a flange portion extending at least partially around a perimeter of the mounting portion, the flange portion covering the portion of the bottom end of the hub covering,
wherein the end cap is coupled to the mounting portion such that the end cap and the mounting portion at least partially define an interior chamber, the nose cap being supported relative to the bottom end of the hub covering within the interior chamber, and the sensor being positioned within the interior chamber.

* * * * *